United States Patent [19]
Barren et al.

[11] Patent Number: 6,084,054
[45] Date of Patent: Jul. 4, 2000

[54] FLAME RETARDANT POLYCARBONATE RESIN/ABS GRAFT COPOLYMER BLENDS HAVING LOW MELT VISCOSITY

[75] Inventors: James Barren, Scotia, N.Y.; Peter Catsman, Bergen op Zoom, Netherlands; Fuh-Sheng Chen, Parkersburg, W. Va.; Eric George, Slingerlands, N.Y.; Luc Carlos Govaerts, Belsele, Belgium; Ron van der Wal, Steenbergen, Netherlands

[73] Assignee: General Electric Company, Pittsfield, Mass.

[21] Appl. No.: 09/050,779

[22] Filed: Mar. 30, 1998

[51] Int. Cl.$^7$ .................................................. C08G 64/00
[52] U.S. Cl. .................................................... 528/196
[58] Field of Search ....................................... 528/196, 198

[56] References Cited

U.S. PATENT DOCUMENTS

| | | | |
|---|---|---|---|
| 2,482,761 | 9/1949 | Goebel | 560/127 |
| 2,664,429 | 12/1953 | Goebel | 562/509 |
| 2,793,219 | 5/1957 | Barrett et al. | 562/509 |
| 2,793,220 | 5/1957 | Barrett et al. | 562/509 |
| 2,955,121 | 10/1960 | Myers et al. | 562/509 |
| 3,076,003 | 1/1963 | Myers et al. | 562/509 |
| 3,169,121 | 2/1965 | Goldberg | 562/509 |
| 3,507,890 | 4/1970 | Dieckelmann et al. | 562/509 |
| 3,544,514 | 12/1970 | Schnell et al. | 528/196 |
| 3,635,895 | 1/1972 | Kramer | 528/196 |
| 3,671,487 | 6/1972 | Abolins | 562/509 |
| 3,723,373 | 3/1973 | Lucas | 525/165 |
| 3,925,342 | 12/1975 | Scharrer | 562/509 |
| 4,001,184 | 1/1977 | Scott | 528/196 |
| 4,430,484 | 2/1984 | Quinn | 525/425 |
| 4,487,896 | 12/1984 | Mark et al. | 525/439 |
| 4,579,906 | 4/1986 | Zabrocki et al. | 524/125 |
| 5,204,394 | 4/1993 | Gosens et al. | 543/436 |
| 5,276,077 | 1/1994 | Schwane et al. | 524/133 |
| 5,411,999 | 5/1995 | Gallucci | 523/436 |
| 5,521,230 | 5/1996 | Bhatia et al. | 523/328 |
| 5,672,645 | 9/1997 | Ecket et al. | 524/127 |

FOREIGN PATENT DOCUMENTS

| | | |
|---|---|---|
| 0 494 602 | 7/1992 | European Pat. Off. . |
| 0 739 914 A1 | 10/1996 | European Pat. Off. . |
| 0 755 977 | 1/1997 | European Pat. Off. . |
| 0 771 852 | 5/1997 | European Pat. Off. . |
| 0 829 517 | 3/1998 | European Pat. Off. . |
| 0 872 522 | 10/1998 | European Pat. Off. . |

*Primary Examiner*—Terressa Mosley

[57] ABSTRACT

A thermoplastic resin composition contains an aromatic carbonate resin, a rubber modified graft copolymer comprising a discontinuous rubber phase dispersed in a continuous rigid thermoplastic phase, wherein at least a portion of the rigid thermoplastic phase is chemically grafted to the rubber phase, wherein the rubber phase of the copolymer is made by an aqueous emulsion polymerization in the presence of a ($C_{30}$–$C_{108}$)polyacid surfactant, and a flame retarding amount of an organophosphorus flame retardant.

12 Claims, No Drawings

FLAME RETARDANT POLYCARBONATE RESIN/ABS GRAFT COPOLYMER BLENDS HAVING LOW MELT VISCOSITY

FIELD OF THE INVENTION

The invention relates to flame retardant polycarbonate resin/ABS graft copolymer blends that exhibit improved performance.

BRIEF DESCRIPTION OF THE RELATED ART

Flame retardant thermoplastic resin compositions that contain an aromatic polycarbonate resin, an ABS graft copolymer, a fluoropolymer and an organophosphate flame retardant are known and have been found to exhibit good flame retardency and good heat resistance, see, for example, coassigned U.S. Pat. No. 5,204,394.

Flame retardant resin compositions that exhibit low melt viscosity and impart improved aesthetic appearance, particularly, improved resistance to streaking, and improved physical properties, particularly, improved resistance to edge cracking, to articles molded therefrom are desired.

SUMMARY OF THE INVENTION

The thermoplastic resin composition of the present invention comprises:

(a) an aromatic polycarbonate resin, (b) a rubber modified graft copolymer comprising a discontinuous rubber phase dispersed in a continuous rigid thermoplastic phase, wherein at least a portion of the rigid thermoplastic phase is chemically grafted to the rubber phase, said rubber modified graft copolymer being made by an aqueous emulsion polymerization process using a ($C_{30}$–$C_{108}$)polyacid surfactant and (c) a flame retarding amount of an organophosphate flame retardant;

The composition of the present invention imparts improved flow properties, improved aesthetic appearance, particularly, improved resistance to splay and streaking, and improved physical properties, particularly, improved resistance to edge cracking, to articles molded therefrom.

DETAILED DESCRIPTION OF THE INVENTION

In a preferred embodiment, the thermoplastic resin composition of the present invention is comprises, based on 100 parts by weight ("pbw") of thermoplastic resin composition, from 40 to 95 pbw, more preferably from 50 to 90 pbw, even more preferably from 55 to 80 pbw, of the aromatic polycarbonate resin, from 4 to 59 pbw, more preferably from 8 to 48 pbw, even more preferably from 14 to 39 pbw, of the rubber modified graft copolymer and from 1 to 20 pbw, more preferably from 2 to 15 pbw, even more preferably from 6 to 12 pbw, of the organophosphate flame retardant.

In a preferred embodiment, the composition exhibits a melt viscosity of less than 3000 grams/10 minutes, more preferably less than 2800 grams/10 minutes at 260° C. at a shear rate of 500 s$^{-1}$.

Aromatic polycarbonate resins suitable for use as the polycarbonate resin component of the thermoplastic resin composition of the present invention are known compounds whose preparation and properties have been described, see, generally, U.S. Pat. Nos. 3,169,121, 4,487,896 and 5,411,999, the respective disclosures of which are each incorporated herein by reference.

In a preferred embodiment, the aromatic polycarbonate resin component of the present invention is the reaction product of a dihydric phenol according to the structural formula (I):

HO—A—OH                                      (I)

wherein A is a divalent aromatic radical, with a carbonate precursor and contains structural units according to the formula (II):

wherein A is defined as above.

As used herein, the term "divalent aromatic radical" includes those divalent radicals containing a single aromatic ring such as phenylene, those divalent radicals containing a condensed aromatic ring system such as, for example, naphthlene, those divalent radicals containing two or more aromatic rings joined by a non-aromatic linkage, such as for example, an alkylene, alkylidene or sulfonyl group, any of which may be substituted at one or more sites on the aromatic ring with, for example, a halo group or ($C_1$–$C_6$) alkyl group.

In a preferred embodiment, A is a divalent aromatic radical according to the formula (XXI):

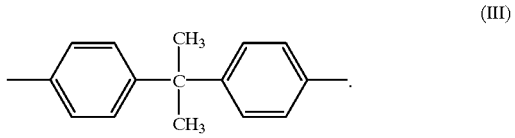

Suitable dihydric phenols include, for example, one or more of 2,2-bis-(4-hydroxyphenyl) propane ("bisphenol A"), 2,2-bis(3,5-dimethyl-4-hydroxyphenyl)propane, bis(4-hydroxyphenyl) methane, 4,4-bis(4-hydroxyphenyl) heptane, 3,5,3',5'-tetrachloro4,4'-dihydroxyphenyl)propane, 2,6-dihydroxy naphthalene, hydroquinone, 2,4'-dihydroxyphenyl sulfone. In a highly preferred embodiment, the dihydric phenol is bisphenol A.

The carbonate precursor is one or more of a carbonyl halide, a carbonate ester or a haloformate. Suitable carbonyl halides include, for example, carbonyl bromide and carbonyl chloride. Suitable carbonate esters include, such as for example, diphenyl carbonate, dichlorophenyl carbonate, dinaphthyl carbonate, phenyl tolyl carbonate and ditolyl carbonate. Suitable haloformates include, for example, bishaloformates of a dihydric phenols, such as, for example, hydroquinone, or glycols, such as, for example, ethylene glycol, neopentyl glycol. In a highly preferred embodiment, the carbonate precursor is carbonyl chloride.

Suitable aromatic polycarbonate resins include linear aromatic polycarbonate resins, branched aromatic polycarbonate resins. Suitable linear aromatic polycarbonates resins include, e.g., bisphenol A polycarbonate resin. Suitable branched polycarbonates are known and are made by reacting a polyfunctional aromatic compound with a dihydric phenol and a carbonate precursor to form a branched polymer, see generally, U.S. Pat. Nos. 3,544,514, 3,635,895 and 4,001,184, the respective disclosures of which are incorporated herein by reference. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxybenzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone-tetracarboxylic dianhydride. The preferred polyfunctional aromatic compounds are 1,1,1-tri(4-hydroxyphenyl)ethane, trimellitic anhydride or trimellitic acid or their haloformate derivatives.

In a preferred embodiment, the polycarbonate resin component of the present invention is a linear polycarbonate resin derived from bisphenol A and phosgene.

In a preferred embodiment, the weight average molecular weight of the polycarbonate resin is from about 10,000 to about 200,000 grams per mole ("g/mol"), as determined by gel permeation chromatography relative to polystyrene. Such resins typically exhibit an intrinsic viscosity of about 0.3 to about 1.5 deciliters per gram in methylene chloride at 25° C.

Polycarbonate resins are made by known methods, such as, for example, interfacial polymerization, transesterification, solution polymerization or melt polymerization.

Copolyester-carbonate resins are also suitable for use as the aromatic polycarbonate resin component of the present invention. Copolyester-carbonate resins suitable for use as the aromatic polycarbonate resin component of the thermoplastic resin composition of the present invention are known compounds whose preparation and properties have been described, see, generally, U.S. Pat. Nos. 3,169,121, 4,430,484 and 4,487,896, the respective disclosures of which are each incorporated herein by reference.

Copolyester-carbonate resins comprise linear or randomly branched polymers that contain recurring carbonate groups, carboxylate groups and aromatic carbocyclic groups in the polymer chain, in which at least some of the carbonate groups are bonded directly to the ring carbon atoms of the aromatic carbocyclic groups.

In a preferred embodiment, the copolyester-carbonate resin component of the present invention is derived from a carbonate precursor, at least one dihydric phenol and at least one dicarboxylic acid or dicarboxylic acid equivalent. In a preferred embodiment, the dicarboxylic acid is one according to the formula (IV):

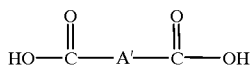

(IV)

wherein A' is alkylene, alkylidene, cycloaliphatic or aromatic and is preferably a non-substituted phenylene radical or a substituted phenylene radical that is substituted at one or more sites on the aromatic ring, wherein each of such substituent groups is independently $(C_1-C_6)$ alkyl, and the copolyester carbonate resin comprises first structural units according to formula (II) above and second structural units according to formula (V):

(V)

wherein A' is defined as above.

Suitable carbonate precursors and dihydric phenols are those disclosed above.

Suitable dicarboxylic acids, include, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid, cis-1,4-cyclohexane dicarboxylic acid, trans-1,4-cyclohexane dicarboxylic acid, 4,4'-bisbenzoic acid, naphthalene-2,6-dicarboxylic acid. Suitable dicarboxylic acid equivalents include, for example, anhydride, ester or halide derivatives of the above disclosed dicarboxylic acids, such as, for example, phthalic anhydride, dimethyl terephthalate, succinyl chloride.

In a preferred embodiment, the dicarboxylic acid is an aromatic dicarboxylic acid, more preferably one or more of terephthalic acid and isophthalic acid.

In a preferred embodiment, the ratio of ester bonds to carbonate bonds present in the copolyester carbonate resin is from 0.25 to 0.9 ester bonds per carbonate bond.

In a preferred embodiment, the copolyester-carbonate copolymer has a weight average molecular weight of from about 10,000 to about 200,000 g/mol.

Copolyester-carbonate resins are made by known methods, such as, for example, interfacial polymerization, transesterification, solution polymerization or melt polymerization.

Rubber modified thermoplastic resins suitable for use as the rubber modified thermoplastic resin of the present invention are those rubber modified thermoplastic resins that are made by a bulk or, synonymously, mass, polymerization process and that comprise a discontinuous rubber phase dispersed in a continuous rigid thermoplastic phase, wherein at least a portion of the rigid thermoplastic phase is chemically grafted to the rubber phase.

Suitable rubbers for use in making the rubber phase are polymers those having a glass transition temperature ($T_g$) of less than or equal to 25° C., more preferably less than or equal to 0° C., and even more preferably less than or equal to −30° C. As referred to herein, the $T_g$ of a polymer is the $T_g$ value of polymer as measured by differential scanning calorimetry (heating rate 20° C./minute, with the $T_g$ value being determined at the inflection point).

In a preferred embodiment, the rubber comprises a linear polymer having structural units derived from one or more conjugated diene monomers.

Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4, hexadiene, dichlorobutadiene, bromobutadiene and dibromobutadiene as well as mixtures of conjugated diene monomers. In a preferred embodiment, the conjugated diene monomer is 1,3-butadiene.

The rubber may, optionally, include structural units derived from one or more copolymerizable monoethylenically unsaturated monomers selected from $(C_2-C_8)$olefin monomers, vinyl aromatic monomers and monoethylenically unsaturated nitrile monomers and $(C_1-C_{12})$alkyl (meth)acrylate monomers.

As used herein, the term "$(C_2-C_8)$olefin monomers" means a compound having from 2 to 8 carbon atoms per molecule and having a single site of ethylenic unsaturation per molecule. Suitable $(C_2-C_8)$olefin monomers include, e.g., ethylene, propene, 1-butene, 1-pentene, heptene.

Suitable vinyl aromatic monomers include, e.g., styrene and substituted styrenes having one or more alkyl, alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile.

As used herein, the term "$(C_1-C_{12})$alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers. Suitable $(C_1-C_{12})$alkyl (meth)acrylate monomers include $(C_1-C_2)$alkyl acrylate monomers, e.g., ethyl acrylate, butyl acrylate, iso-pentyl acrylate, n-hexyl acrylate, 2-ethyl hexyl acrylate, and their $(C_1-C_{12})$alkyl methacrylate analogs such as, e.g., methyl methacrylate, ethyl methacrylate, propyl methacrylate, iso-propyl methacrylate, butyl methacrylate, hexyl methacrylate, decyl methacrylate.

In a first preferred embodiment, the rubber is a polybutadiene homopolymer.

In an alternative preferred embodiment, the rubber is a copolymer, preferably a block copolymer, comprising structural units derived from one or more conjugated diene monomers and up to 50 percent by weight ("wt %") structural units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer.

In a highly preferred embodiment, the rubber is a styrene-butadiene block copolymer that contains from 50 to 95 wt % structural units derived from butadiene and from 5 to 50 wt % structural units derived from styrene.

The elastomeric phase is made by aqueous emulsion polymerization in the presence of a free radical initiator, a polyacid surfactant and, optionally, a chain transfer agent and coagulated to form particles of elastomeric phase material.

Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate.

Suitable chain transfer agents include, for example, a $(C_9-C_{13})$ alkyl mercaptan compound such as nonyl mercaptan, t-dodecyl mercaptan.

Suitable polyacid surfactants include soaps of a polycarboxylic acid that contains from 30 to 108 carbon, more preferably from 32 to 60 carbon atoms, per molecule.

Suitable polycarboxylic acids may be formed by dimerizing a monobasic fatty acid containing ethylenic linkages and from about 14 to about 22 carbon atoms in length. Suitable monobasic fatty acids include, for example, oleic, elaidic, palmitoleic, linoleic, linolenic, licanic, arachidonic, erucic, clupanodonic and elaeostearic acids. In commercial practice naturally occurring mixtures of these acids are generally employed for production of dimerized fatty acids. Such acids may be derived from sources such as tall oil fatty acids, tallow (animal grease) fatty acids and vegetable oils, e.g. soya, linseed, cottonseed, and other oils comprised of unsaturated fatty acid glycerides. In general, the dimerization is carried out by heating the monomeric acid at an elevated temperature, with or without a catalyst, while avoiding cracking and decarboxylation. U.S. Pat. Nos. 2,482,761, 2,664,429, 2,793,219, 2,793,220, 2,955,121, 3,076,003, 3,507,890 and 3,925,342 describe dimerization in further detail.

For improved color, the dimerized fatty acids may be partially or fully saturated by hydrogenation in a subsequent reaction step as described in Chapter 5 entitled "Hydrogenation of Fatty Acids" in the book "Fatty Acids in Industry" edited by Robert Johnson and Earle Fritz and published by Marcel Dekker, Inc. NY, N.Y. Suitable dimer acids are liquid at 250C. even though their number average molecular weight is typically above 500 g/mol.

In a preferred embodiment, the polyacid surfactant comprises greater than or equal to 50 wt % of one or more fatty acid dimers and trimers. The dimerized fatty acids employed to prepare the novel compositions of this invention preferably comprise a product having not more than about 70% tribasic acid and for very low non juicing characteristics not more than 10% monobasic acids. And preferably not more than 5% by weight monobasic acid based on the total weight of the polyacid component. The dimerized acid content is preferably at least 75% by weight based on the total weight of the surfactant. It is further more important to note that there is no rosin acid, abietic acid or derivatives thereof present in these compositions in part because such materials as abietic acid can be undesirably volatile and can result in juicing.

Preferred polyacids are acyclic aliphatic polyacids, cyclic aliphatic polyacids and cyclic aromatic polyacids. The polyacid is preferably a high molecular weight polyacid having from 30 to 108 carbon atoms and preferred 32 to 60 carbon atoms. Preferably the polyacid is soluble and/or miscible in the thermoplastic compositions.

Preferably the polyacid in the form of carboxylate salts of the polyacid function are surfactants, emulsifiers or soaps.

Various types of dimerized fatty acids are commercially available and such products typically contain trimerized fatty acids, which are tribasic acids formed as a by-product through the polymerization of three molecules of the monobasic fatty acids. Higher polybasic acids such as tetracarboxylic ($C_{72}$) acid and hexacarboxylic ($C_{108}$) acids may also be present. In addition, the commercial products may contain small percentages of isomerized monobasic acids or unreacted or fully saturated monomeric monobasic fatty acids which did not polymerize or which were not removed after the polymerization was carried out.

In a preferred embodiment, the polyacid is used in the emulsion polymerization of the rubber phase of the rubber modified graft copolymer of the present invention in an amount of from 0.25 to 5 wt %, more preferably from 0.75 to 3.5 wt % thereof, more preferably from 1.5 to 2.75 wt %, based on 100 parts by weight of butadiene monomer.

In a preferred embodiment, the rubber is polymerized in the presence of an amount of a chain transfer agent that is effective to provide a rubber having a swell index in toluene of greater than 15, more preferably from 20 to 150 and even more preferably from about 40 to 100. The swell index is measured by immersing about 0.2 grams of a cast film of sample composition in about 96 milliliters of toluene for 16 hours at room temperature. The swell index is calculated by dividing the weight of the swollen sample by the weight of the dry sample.

In a preferred embodiment, the emulsion polymerized particles of elastomeric phase material have a weight average particle size of 50 to 800 nanometers ("nm"), more preferably, of from 100 to 500 nm, as measured by light transmission. The size of emulsion polymerized elastomeric particles may optionally be increased by mechanical, colloidal or chemical agglomeration of the emulsion polymerized particles, according to known techniques.

The rigid thermoplastic resin phase comprises one or more thermoplastic polymers and exhibits a $T_g$ of greater than 25° C., preferably greater than or equal to 90° C. and even more preferably greater than or equal to 100° C.

In a preferred embodiment, the rigid thermoplastic phase comprises one or more polymers each having structural units derived from one or more monomers selected from the group consisting of $(C_1-C_{12})$alkyl (meth)acrylate monomers, vinyl aromatic monomers and monoethylenically unsaturated nitrile monomers.

Suitable vinyl aromatic monomers and monoethylenically unsaturated nitrile monomers and of $(C_1-C_{12})$alkyl (meth) acrylate monomers are those set forth above in the description of the rubber phase.

In a preferred embodiment, the rigid thermoplastic resin phase comprises a vinyl aromatic polymer having first structural units derived from one or more vinyl aromatic monomers, preferably styrene, and having second structural units derived from one or more monoethylenically unsaturated nitrile monomers, preferably acrylonitrile. More preferably, the rigid phase comprises from 55 to 99 wt %, still more preferably 60 to 90 wt %, structural units derived from styrene and from 1 to 45 wt %, still more preferably 10 to 40 wt %, structural units derived from acrylonitrile.

The amount of grafting that takes place between the rigid thermoplastic phase and the rubber phase varies with the relative amount and composition of the rubber phase. In a preferred embodiment, from 10 to 90 wt %, preferably from 25 to 60 wt %, of the rigid thermoplastic phase is chemically grafted to the rubber phase and from 10 to 90 wt %, preferably from 40 to 75 wt % of the rigid thermoplastic phase remains "free, i.e., non-grafted.

The rigid thermoplastic phase of the rubber modified thermoplastic resin may be formed: (i) solely by polymerization carried out in the presence of the rubber phase or (ii) by addition of one or more separately polymerized rigid thermoplastic polymers to a rigid thermoplastic polymer that has been polymerized in the presence of the rubber phase.

In a preferred embodiment, one or more separately polymerized rigid thermoplastic polymers to a rigid thermoplastic polymer that has been polymerized in the presence of the rubber phase in order to aid in adjusting the viscosity of the composition of the present invention into the desired range. In a more highly preferred embodiment, the weight average molecular weight of the one or more separately polymerized rigid thermoplastic polymers is from about 50,000 to about 100,000 g/mol.

In a preferred embodiment, the rubber modified thermoplastic resin comprises an rubber phase comprising a polymer having structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers.

In a highly preferred embodiment, the rubber phase of the rubber modified graft copolymer comprises a polybutadiene or poly(styrene-butadiene) rubber and the rigid phase comprises a styrene-acrylonitrile copolymer.

Each of the polymers of the rubber phase and of the rigid thermoplastic resin phase of the rubber modified thermoplastic resin may, provided that the $T_g$ limitation for the respective phase is satisfied, optionally include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy $(C_1-C_{12})$alkyl (meth)acrylate monomers such as, e.g., hydroxyethyl methacrylate; $(C_4-C_2)$cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "$(C_4-C_{12})$cydoalkyl" means a cyclic alkyl substituent group having from 4 to 12 carbon atoms per group and the term "(meth)acrylamide" refers collectively to acrylamides and methacrylamides.

In a preferred embodiment, the rubber phase of rubber modified thermoplastic resin has a particle size of from 0.1 to 3.0 micrometers ("$\mu$m") more preferably from 0.2 to 2.0 $\mu$m.

In a preferred embodiment, the composition of the present invention includes a fluoropolymer, in an amount, typically from 0.01 to 0.5 pbw fluoropolymer per 100 pbw of the thermoplastic resin composition, that is effective to provide anti-drip properties to the resin composition. Suitable fluoropolymers and methods for making such fluoropolymers are known, see, e.g., U.S. Pat. Nos. 3,671,487, 3,723,373 and 3,383,092. Suitable fluoropolymers include homopolymers and copolymers that comprise structural units derived from one or more fluorinated α-olefin monomers. The term "fluorinated α-olefin monomer" means an α-olefin monomer that includes at least one fluorine atom substituent. Suitable fluorinated α-olefin monomers include, e.g., fluoroethylenes such as, e.g., $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$ and fluoropropylenes such as, e.g., $CF_3CF=CF_2$, $CF_3CF=CHF$, $CF_3CH=CF_2$, $CF_3CH=CH_2$, $CF_3CF=CHF$, $CHF_2CH=CHF$ and $CF_3CH=CH_2$. In a preferred embodiment, the fluorinated α-olefin monomer is one or more of tetrafluoroethylene ($CF_2=CF_2$), chlorotrichloroethylene ($CClF=CF_2$), vinylidene fluoride ($CH_2=CF_2$) and hexafluoropropylene ($CF_2=CFCF_3$).

Suitable fluorinated α-olefin homopolymers include e.g., poly(tetra-fluoroethylene), poly(hexafluoroethylene).

Suitable fluorinated α-olefin copolymers include copolymers comprising structural units derived from two or more fluorinated α-olefin copolymers such as, e.g., poly (tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, e.g., poly (tetrafluoroethylene-ethylene-propylene) copolymers. Suitable non-fluorinated monoethylenically unsaturated monomers include e.g., α-olefin monomers such as, e.g., ethylene, propylene butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate.

In a preferred embodiment, the fluoropolymer particles range in size from 50 to 500 nm, as measured by electron microscopy.

In a highly preferred embodiment, the fluoropolymer is a poly(tetrafluoroethylene) homopolymer ("PTFE").

Since direct incorporation of a fluoropolymer into a thermoplastic resin composition tends to be difficult, it is preferred that the fluoropolymer be pre-blended in some manner with a second polymer, such as for, example, an aromatic polycarbonate resin or a styrene-acrylonitile resin. For example, an aqueous dispersion of fluoropolymer and a polycarbonate resin may be steam precipitated to form a fluoropolymer concentrate for use as a drip inhibitor additive in thermoplastic resin composition, as disclosed in, for example, U.S. Pat. No. 5,521,230, or, alternatively, an aqueous styrene-acrylonitrile resin emulsion or an aqueous acrylonitrile-butadiene-styrene resin emulsion and then precipitating and drying the co-coagulated fluoropolymer-thermoplastic resin composition to provide a PTFE-thermoplastic resin powder as disclosed in, for example, U.S. Pat. No. 4,579,906.

In a preferred embodiment, the fluoropolymer additive comprises from 30 to 70 wt %, more preferably 40 to 60 wt %, of the fluoropolymer and from 30 to 70 wt %, more preferably 40 to 60 wt %, of the second polymer.

In a preferred embodiment, a fluoropolymer additive is made by emulsion polymerization of one or more monoethylenically unsaturated monomers in the presence of the aqueous fluoropolymer dispersion of the present invention to form a second polymer in the presence of the fluoropolymer. Suitable monoethylenically unsaturated monomers are disclosed above. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder.

In a preferred embodiment, the monoethylenically unsaturated monomers that are emulsion polymerized to form the second polymer comprise one or more monomers selected from vinyl aromatic monomers, monoethylenically unsaturated nitrile monomer and $(C_1-C_{12})$alkyl (meth)acrylate monomers. Suitable vinyl aromatic monomers, monoethylenically unsaturated nitrite monomer and $(C_1-C_{12})$alkyl (meth)acrylate monomers are disclosed above.

In a highly preferred embodiment, the second polymer comprises structural units derived from styrene and acrylonitrile. More preferably, the second polymer comprises from 60 to 90 wt % structural units derived from styrene and from 10 to 40 wt % structural units derived from acrylonitrile.

The emulsion polymerization reaction mixture may optionally include emulsified or dispersed particles of a third polymer, such as, e.g., an emulsified butadiene rubber latex.

The emulsion polymerization reaction is initiated using a conventional free radical initiator, as disclosed above with respect to the rubber modified graft copolymer.

A chain transfer agent such as, e.g., a $(C_9-C_{13})$ alkyl mercaptan compound such as nonyl mercaptan, t-dodecyl mercaptan, may, optionally, be added to the reaction vessel during the polymerization reaction to reduce the molecular weight of the second polymer. In a preferred embodiment, no chain transfer agent is used.

In a preferred embodiment, the stabilized fluoropolymer dispersion is charged to a reaction vessel and heated with stirring. The initiator system and the one or more monoethylenically unsaturated monomers are then charged to the reaction vessel and heated to polymerize the monomers in the presence of the fluoropolymer particles of the dispersion to thereby form the second polymer.

Suitable fluoropolymer additives and emulsion polymerization methods are disclosed in EP 0 739 914 A1.

In a preferred embodiment, the second polymer exhibits a weight average molecular weight of from about 10,000 to about 200,000 g/mol.

Organophosphorus compounds suitable as the organophosphorus flame retardant of the present invention are known compounds including monophosphate esters such as, for example, triphenyl phosphate, tricresyl phosphate, tritolyl phosphate, diphenyl tricresylphosphate, phenyl bis-dodecyl phosphate, ethyl diphenyl phosphate, as well as diphosphate esters and oligomeric phosphates such as, for example, resorcinol diphosphate, diphenyl hydrogen phosphate, 2-ethylhexyl hydrogen phosphate. Suitable oligomeric phosphate compounds are set forth in coassigned U.S. Pat. No. 5,672,645, to Johannes C. Gossens et al for a "Polymer Mixture Having Aromatic Polycarbonate, Styrene Containing Copolymer and/or Graft Copolymer and a Flame Retardant, Articles Formed Therefrom", the disclosure of which is hereby incorporated herein by reference.

In a preferred embodiment, the organophosphorus flame retardant of the present invention comprises one or more compounds according to the structural formula (VI):

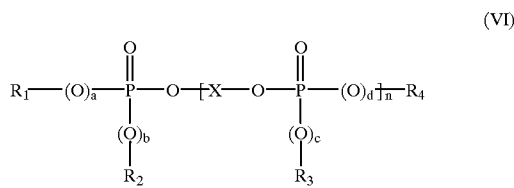

(VI)

wherein $R_1$, $R_2$, $R_3$ and $R_4$ are each independently aryl, which may be optionally substituted with halo or alkyl, X is arylene, optionally substituted with halo or alkyl, a, b, c and d are each independently 0 or 1, and n is an integer of from 0 to 5, more preferably from 1 to 5.

As used herein, aryl means a monovalent radical containing one or more aromatic rings per radical, which, in the case wherein the radical contains two or more rings, may be fused rings and which may optionally be substituted on the one or more aromatic rings with one or more alkyl groups, each preferably $(C_1-C_6)$alkyl.

As used herein, arylene means a divalent radical containing one or more aromatic rings per radical, which may optionally be substituted on the one or more aromatic rings with one or more alkyl groups, each preferably $(C_1-C_6)$alkyl and which, in the case wherein the divalent radical contains two or more rings, the rings may be may be fused or may be joined by a non-aromatic linkages, such as for example, an alkylene, alkylidene, any of which may be substituted at one or more sites on the aromatic ring with a halo group or $(C_1-C_6)$alkyl group.

In a highly preferred embodiment, $R_1$, $R_2$, $R_3$ and $R_4$ are each phenyl, a, b, c and d are each 1 and X is phenylene, more preferably 1,3-phenylene.

In an alternative highly preferred embodiment, embodiment, $R_1$, $R_2$, $R_3$ and $R_4$ are each phenyl, a, b, c and d are each 1 and X is a divalent radical according to the structural formula (VII):

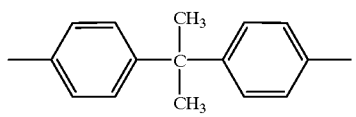

(VII)

In preferred embodiment, the organophosphorus flame retardant comprises a blend of organophosphorus oligomers, each according to formula (VI), wherein n is, independently for each oligomer, an integer from 1 to 5 and wherein the blend of oligomers has an average n of from greater than 1 to less than 5, more preferably greater than 1 to less than 3, even more preferably greater than 1 to less than 2, still more preferably from 1.2 to 1.7.

The thermoplastic resin composition of the present invention may optionally also contain various conventional additives, such as antioxidants, such as, e.g., organophosphites, e.g., tris(nonyl-phenyl)phosphite, (2,4,6-tri-tert-butylphenyl)(2-butyl-2-ethyl-1,3-propanediol) phosphite, bis(2,4-di-t-butylphenyl)pentaerythritol diphosphite or distearyl pentaerythritol diphosphite, as well as alkylated monophenols, polyphenols, alkylated reaction products of polyphenols with dienes, such as, e.g., butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)propionic acid with monohydric or polyhydric alcohols, esters of beta-(5-tert-butyl-4hydroxy-3-methylphenyl)-propionic acid with monohydric or polyhydric alcohols, esters of beta-(5-tert-butylhydroxy-3-methylphenyl) propionic acid with mono-or polyhydric alcohols, esters of thioalkyl or thioaryl compounds, such as, e.g., distearylthiopropionate, dilaurylthiopropionate, ditridecylthiodipropionate, amides of beta-(3,5-di-tert-butyl-4-hydroxyphenol)-propionic acid; UV absorbers and light stabilizers such as, e.g., (i) 2-(2'-hydroxyphenyl)-benzotriazoles, 2-Hydroxybenzophenones; (ii) esters of substituted and unsubstituted benzoic acids, (iii) acrylates, (iv) nickel compounds; sterically hindered amines such as, e.g., triisopropanol amine or the reaction product of 2,4-dichloro-6-(4-morpholinyl)-1,3,5-triazine with a polymer of 1,6-diamine, N,N'-Bis(-2,2,4,6-tetramethyl-4-piperidenyl) hexane; neutralizers such as magnesium stearate, magnesium oxide, zinc oxide, zinc stearate, hydrotalcite; impact modifiers; fillers and reinforcing agents, such as, e.g., silicates, $TiO_2$ glass fibers, carbon black, graphite, calcium carbonate, talc, mica; and other additives such as, e.g., lubricants such as, e.g., pentaerythritol tetrastearate, EBS wax, silicone fluids, plasticizers, optical brighteners, pigments, dyes, colorants, flameproofing agents; anti-static agents; and blowing agents, as well as other flame retardants in addition to the above-disclosed organophosphorus flame retardant and fluoropolymer.

The thermoplastic resin composition of the present invention is made by combining and mixing the components of the composition of the present invention under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition.

The thermoplastic resin composition of the present invention can be molded into useful shaped articles by a variety of means such as injection molding, extrusion, rotational molding, blow molding and thermoforming to form articles such as, for example, computer and business machine housings, home appliances.

EXAMPLES 1–6 AND COMPARATIVE EXAMPLES C1–C6

Examples 1–6 and Comparative Examples C1–C6 were made using two different types of ABS resin.

Process A

A rubber phase was made by emulsion polymerizing butadiene monomer (100 pbw) in water (159 pbw) and in the presence of a soap (tallow fatty acid, 3 pbw), a polymerization initiator (potassium persulfate, 0.135 pbw) and a chain transfer agent (t-dodecyl mercaptan, 0.2 pbw). The reaction mixture was then homogenized to provide rubber latex having an average particle size of about 295 nm. A rigid phase comprising about 75 wt % styrene and 25 wt % acrylonitrile was then grafted to the particles of the rubber latex.

Process B

A rubber phase was made by emulsion polymerizing butadiene monomer (100 pbw) in water (159 pbw) and in the presence of a soap (Empol 1018, Henkel Corporation, 3 pbw), a polymerization initiator (potassium persulfate, 0.135 pbw), a chain transfer agent (t-dodecyl mercaptan, 0.55 pbw) and sodium formaldehyde sulfoxylate (0.05 pbw). The reaction mixture was then homogenized to provide rubber latex having an average particle size of about 310 nm. A rigid phase comprising about 75 wt % styrene and 25 wt % acrylonitrile was then grafted to the particles of the rubber latex.

The thermoplastic resin compositions of Examples 1–6 of the present invention and of Comparative Examples C1–C6 were each made by combining the components described below in the relative amounts (each expressed in parts by weight) set forth in TABLES I and II. The components used in the thermoplastic resin compositions were as follows:

PC-1: Linear polycarbonate resin derived from bisphenol A and phosgene.

PC-2: Linear polycarbonate resin derived from bisphenol A and phosgene.

PC-3: Linear polycarbonate resin derived from bisphenol A, phosgene and having an intrinsic viscosity of about 47 milliliters per gram in methylene chloride at 25° C.

PC-4: Linear polycarbonate resin derived from bisphenol A, phosgene and having an intrinsic viscosity of about 49.3 milliliters per gram in methylene chloride at 25° C.

PC-5: Linear polycarbonate resin derived from bisphenol A, phosgene and having an intrinsic viscosity of about 51.7 milliliters per gram in methylene chloride at 25° C.

PC-6: Linear polycarbonate resin derived from bisphenol A, phosgene and having an intrinsic viscosity of about 54 milliliters per gram in methylene chloride at 25° C.

ABS-1: Acrylonitrile-butadiene-styrene graft copolymer made the Process A described above and comprising about 50 wt % of a discontinuous polybutadiene rubber phase having a swell index of about 12.99 and about 50 wt % of a rigid styrene-acrylonitriie thermoplastic phase (copolymer of 75 wt % styrene and 25 wt % acrylonitrile);

ABS-2: Acrylonitrile-butadiene-styrene graft copolymer made by the process B described above and comprising about 50 wt % of a discontinuous polybutadiene rubber phase having a swell index of about 73.2 and about 50 wt % of a rigid styrene-acrylonitrile thermoplastic phase (copolymer of 75 wt % styrene and 25 wt % acrylonitrile;

SAN-1: Copolymer of 75 wt % styrene and 25 wt % acrylonitrile having a weight average molecular weight of about 60,000 g/mol;

SAN-2: Copolymer of 75 wt % styrene and 25 wt % acrylonitrile having a weight average molecular weight of 94,000 g/mol;

TSAN: Additive made by copolymerizing styrene and acrylonitrile in the presence of an aqueous dispersion of PTFE (50 pbw PTFE, 50 pbw of a styrene-acrylonitrile copolymer containing 75 wt % styrene and 25 wt % acrylonitrile); and RDP Resorcinol diphosphate (Fyroflex™ RDP, Akzo Chemicals).

The melt viscosity ("MV") of was measured at 500° F. and at shear rates of 500 s$^{-1}$, 1000 s$^{-1}$ and 1500 s$^{-1}$, using a capillary rheometer (Kayeness, Model 8052) and the notched Izod impact strength was measured according to ASTM D256 for each of the compositions of Examples 1–2 and Comparative Examples C1–C2. The melt viscosity, expressed in Poise, and the notched Izod impact results, expressed in ft-lb/in, are set forth below in Table I, for each of the compositions.

The compositions were used to injection mold sample plaques. The appearance of the plaques were evaluated by 5 operators rating 5 sample plaques of each composition on a scale of 1 to 5 with 1 being the best measurement and 5 the worst. The values for all five samples of each composition were summed for the overall measurement given for the composition in TABLE I below.

TABLE I

|  | C1 | C2 | 1 | 2 |
| --- | --- | --- | --- | --- |
| PC-1 | 44.03 | 44.03 | 44.03 | 44.03 |
| PC-2 | 29.36 | 29.36 | 29.36 | 29.36 |
| ABS-1 | 6.5 | 6.5 | — | — |
| ABS-2 | — | — | 6.5 | 6.5 |
| SAN-1 | 8.8 | — | 8.8 | — |
| SAN-2 | — | 8.8 | — | 8.8 |
| RDP | 9.5 | 9.5 | 9.5 | 9.5 |
| TSAN | 0.5 | 0.5 | 0.5 | 0.5 |
| ADDITIVES | 0.31 | 0.31 | 0.31 | 0.31 |
| MV, 260° C., 2.16 kg | | | | |
| 500s$^{-1}$ | 2359 | 2825 | 2367 | 2634 |
| 1000s$^{-1}$ | 1807 | 2101 | 1821 | 1988 |
| 1500s$^{-1}$ | 1518 | 1712 | 1511 | 1635 |
| Streaking (rated by visual examination) | 125 | 63 | 79 | 45 |
| Notched Izod Impact, RT (lb/in) | 10.3 | 10.8 | 9.8 | 10.9 |

The melt flow index (MFI), expressed in grams per 10 minutes ("g/10 min."), notched Izod impact strength at 23° C., expressed in foot-pounds per inch ("ft-lb/in") are set forth below in TABLE II for each of the compositions.

Sample plaques were molded from each of the compositions and evaluated for evidence of edge cracking. Results are set forth below in TABLE II.

TABLE II

|  | C3 | C4 | C5 | C6 | 3 | 4 | 5 | 6 |
| --- | --- | --- | --- | --- | --- | --- | --- | --- |
| PC-3 | 73.09 | — | — | — | 73.09 | — | — | — |
| PC-4 | — | 73.09 | — | — | — | 73.09 | — | — |
| PC-5 | — | — | 73.09 | — | — | — | 73.09 | — |
| PC-6 | — | — | — | 73.09 | — | — | — | 73.09 |
| ABS-1 | 6.5 | 6.5 | 6.5 | 6.5 | — | — | — | — |
| ABS-2 | — | — | — | — | 6.5 | 6.5 | 6.5 | 6.5 |
| RDP | 9.5 | 9.5 | 9.5 | 9.5 | 9.5 | 9.5 | 9.5 | 9.5 |
| TSAN | 0.5 | 0.5 | 0.5 | 0.5 | 0.5 | 0.5 | 0.5 | 0.5 |
| ADDITIVES | 2.36 | 2.36 | 2.36 | 2.36 | 2.36 | 2.36 | 2.36 | 2.36 |
| MVR, 260° C., 2.16 kg (ml/10 minutes) | 24.70 | 19.60 | 14.20 | 10.80 | 21.90 | 17.70 | 13.50 | 10.67 |
| Notched Izod Impact (kJ/m$^2$) | 16.0 | 10.1 | 11.7 | 30.1 | 11.5 | 10.8 | 13.5 | 10.67 |
| Number of edge cracks | 33.7 | 17 | 7.7 | 0 | 14.4 | 7.8 | 0.4 | 3 |

We claim:

1. A thermoplastic resin composition, comprising:
   (a) an aromatic carbonate resin,
   (b) a rubber modified graft copolymer comprising a discontinuous rubber phase dispersed in a continuous rigid thermoplastic phase, wherein at least a portion of the rigid thermoplastic phase is chemically grafted to the rubber phase, wherein the rubber phase of the copolymer is made by an aqueous emulsion polymerization in the presence of a ($C_{30}$–$C_{108}$) polyacid surfactant, and
   (c) a flame retarding amount of an organophosphorus flame retardant comprising one or more compounds according to the structural formula (VI):

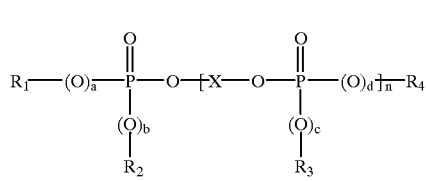

wherein
$R_1$, $R_2$, $R_3$ and $R_4$ are each independently aryl, which may be optionally substituted with halo or alkyl,
X is arylene, optionally substituted with halo or alkyl,
a, b, c and d are each independently 0 or 1, and
n is an integer from 1 to 5.

2. The composition of claim 1, wherein the composition comprises, based on 100 parts by weight the thermoplastic resin composition, from 40 to 95 parts by weight of the aromatic polycarbonate resin, from 4 to 59 parts by weight of the rubber modified graft copolymer and from 1 to 20 parts by of the organophosphate flame retardant.

3. The composition of claim 1, wherein the polycarbonate resin is derived from bisphenol A and phosgene.

4. The composition of claim 1, wherein the rubber phase comprises a polybutadiene polymer or a poly(styrene-butadiene) copolymer and the rigid thermoplastic phase comprises structural units derived from one or more monomers selected from vinyl aromatic monomers and a monoethylenically unsaturated nitrile monomers.

5. The composition of claim 4, wherein rigid phase comprises a copolymer of derived from monomers selected from the group consisting of styrene, α-methyl styrene and acrylonitrile.

6. The composition of claim 1, wherein emulsion polymerization is carried out in the presence of an amount of a chain transfer agent effective to provide a rubber having a swell index of greater than 15.

7. The composition of claim 1, wherein the organophosphorus flame retardant comprises one or more compounds according to the structural formula (VI):

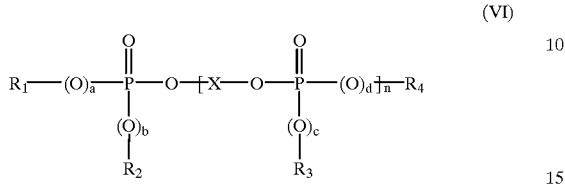

(VI)

wherein $R_1$, $R_2$, $R_3$ and $R_4$ are each independently aryl, which may be optionally substituted with halo or alkyl, X is arylene, optionally substituted with halo or alkyl, a, b, c and d are each independently 0 or 1, and n is an integer from 0 to 5.

8. The composition of claim 1, wherein the composition further comprises a fluoropolymer, in an amount effective to provide anti-drip properties to the composition.

9. The composition of claim 1, wherein the fluoropolymer is a tetrafluoroethylene polymer.

10. The composition of claim 1, wherein the fluoropolymer is added to the composition in the form of an additive made by emulsion polymerization of one or more monoethylenically unsaturated monomers in the presence of an aqueous dispersion of the fluoropolymer.

11. The composition of claim 10, wherein the additive is made by emulsion polymerization of styrene and acrylonitrile in the presence of an aqueous dispersion of polytetrafluoroethylene particles.

12. A thermoplastic resin composition, comprising the composition resulting from blending:

(a) a polycarbonate resin, (b) a rubber modified graft copolymer comprising a discontinuous rubber phase dispersed in a continuous rigid thermoplastic phase, wherein at least a portion of the rigid thermoplastic phase is chemically grafted to the rubber phase, said rubber modified graft copolymer being made aqueous emulsion polymerization in the presence of a ($C_{30}$–$C_{108}$)polyacid surfactant and (c) (c) a flame retarding amount of an organophosphorus flame retardant comprising one or more compounds according to the structural formula (VI):

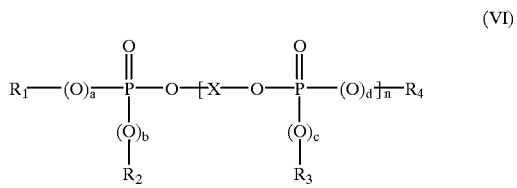

(VI)

wherein $R_1$, $R_2$, $R_3$ and $R_4$ are each independently aryl, which may be optionally substituted with halo or alkyl, X is arylene, optionally substituted with halo or alkyl, a, b, c and d are each independently 0 or 1, and n is an integer from 1 to 5.

* * * * *